H. J. KIMMAN.
CHUCK.
APPLICATION FILED SEPT. 12, 1904.
993,382.
Patented May 30, 1911.
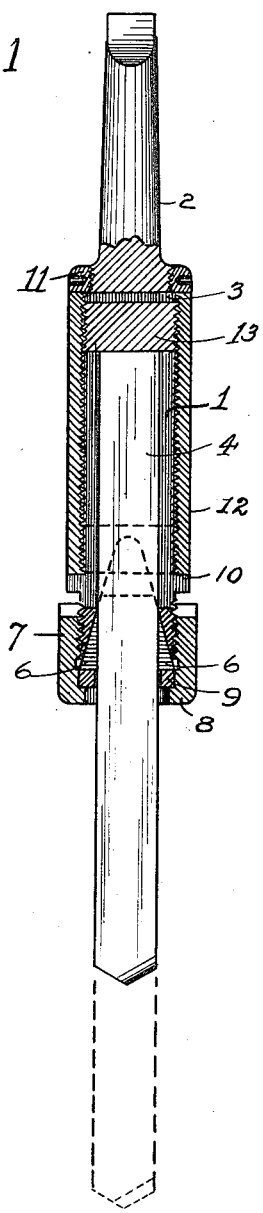
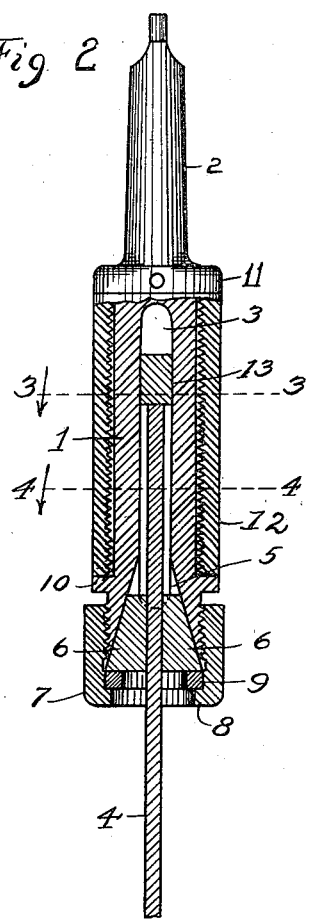
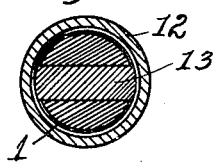
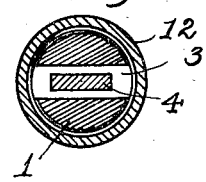
WITNESSES:
J. Francis Small
Louis B. Erwin
INVENTOR
Henry J. Kimman
BY
Rector & Hibben
his ATTORNEYS

UNITED STATES PATENT OFFICE.

HENRY J. KIMMAN, OF CLEVELAND, OHIO, ASSIGNOR TO CHICAGO PNEUMATIC TOOL COMPANY, OF CHICAGO, ILLINOIS, A CORPORATION OF NEW JERSEY.

CHUCK.

993,382.  Specification of Letters Patent.  Patented May 30, 1911.

Application filed September 12, 1904. Serial No. 224,120.

*To all whom it may concern:*

Be it known that I, HENRY J. KIMMAN, a citizen of the United States, residing at the city of Cleveland, in the county of Cuyahoga and State of Ohio, have invented certain new and useful Improvements in Chucks, of which the following is a specification.

My invention relates to chucks or the like adapted and designed for the purpose of holding the working tools, such as drills, and the object of my invention is to produce a novel and efficient chuck adapted to hold or clamp that form of drill which is substantially a flat bar rectangular in cross section.

The feature of advantage and utility of my improved chuck will be apparent from the description hereinafter given.

In the drawing, Figure 1 is a central longitudinal section of my improved chuck; Fig. 2 a similar section taken at right angles to that of Fig. 1; and Figs. 3 and 4 sections on lines 3 and 4 respectively of Fig. 2.

As shown in the drawing, the chuck comprises a substantially cylindrical tool holder 1 which is provided with or attached to a shank 2 which is inserted in the socket of the operating machine or tool, such as, for instance, a pneumatic drilling machine as now well known and in common use.

The tool holder 1 has a transverse slot 3 extending longitudinally thereof for the greater portion of its length. This slot which is rectangular in cross section is of a size to receive the body of the flat bar shaped tool 4, as clearly indicated in the drawing. The lower or outer end of this tool holder has a conical base 5 at its apex, extending into the slot 3.

Within the conical recess or bore of the tool holder are arranged two similar clamping members or clamps 6, which are substantially halves of a truncated cone. The drill passes between the clamps and is clamped thereby by forcing them upwardly or inwardly in the conical bore of the tool holder. To thus clamp the tool I employ, in the present instance, a clamping collar or cap 7 internally screw-threaded and adapted to screw upon the outer and screw-threaded end of the tool holder 1. This collar, when screwed upon the tool holder, is designed to force the clamps 6 inwardly to clamp the tool in the manner already explained. Instead of having the collar 7 bear directly against the clamps I prefer to interpose between such clamps and an inturned flange 8 of the collar, a ring 9 with the result that the frictional contact is had between the ring and the collar, thereby reducing the resistance to the rotation of the collar and obtaining a tighter clamping of the tool.

The tool holder is substantially cylindrical as stated but is provided toward its outer end with a flange 10 and at its other end with another flange which, as shown, is formed by a ring 11 screwing onto the reduced upper end of the tool holder.

Between the flanges 10 and 11 of the tool holder is arranged a sleeve 12 adapted to rotate and thereby adjust an abutment for the purpose of limiting the degree of insertion of the tool or drill and for forcing such drill outwardly when desired or after the same becomes shortened after continued use and sharpening. To this end the sleeve is internally screw-threaded in order to coöperate with an abutment or block 13 fitting in the slot 3 and movable freely therein. This block extends transversely of the slot and entirely thereacross with its ends provided with screw threads engaging the screw threads on the interior of the sleeve 12, with the result that rotation of the sleeve moves the block longitudinally according to the direction of rotation.

From the foregoing description it will be observed that in inserting the drill the block 13 forms an adjustable stop against which the inner end of the drill strikes. After the drill is inserted, the same may be given the desired amount of projection beyond the end of the chuck by adjusting the block 13 in or out. When the drill is new and of the full length, the block 13 is at the innermost position or adjustment, as indicated in full lines in Fig. 1, and as in use the drill becomes shorter the block together with the drill is adjusted or moved outwardly by rotation of the handle in order that the drill may project the desired distance, as indicated in dotted lines in Fig. 1. When this desired projection is obtained, the collar 7 is screwed up tight with the result that the clamps 6 tightly clamp the drill or tool.

I claim:

1. A chuck comprising a tool consisting of a shank and tool holder proper, the latter having a longitudinal slot extending through opposite sides and substantially from end to end of such tool holder proper to receive a flat tool or drill and designed to coöperate with the same along its length and thereby hold the tool against rotation, and means coöperating with said tool holder for clamping the tool thereto.

2. A chuck comprising a tool consisting of a shank and tool holder proper, the latter having a longitudinal slot extending through opposite sides and substantially from end to end of such tool holder proper to receive a flat tool or drill and designed to coöperate with the same along its length and thereby hold the tool against rotation, and means coöperating with said tool holder for clamping the tool thereto consisting of a pair of clamps arranged at the outer end of the slot and coöperating with the tool holder proper to engage opposite sides of the tool intermediate its length.

3. A chuck comprising a tool holder having a longitudinal slot extending through opposite sides and substantially from end to end to receive a flat tool and designed to coöperate with the same along its length and thereby hold the tool against rotation, an adjustable block movable longitudinally in said slot and adapted to coöperate with the inner end of the tool when inserted, and means coöperating with the tool holder for clamping the tool thereto.

4. A chuck comprising a tool consisting of a shank and tool holder proper, the latter having a longitudinal slot extending substantially from end to end of such tool holder proper to receive a flat tool or drill and designed to coöperate with the same along its length and thereby hold the tool against rotation, said slot terminating at its outer end in a conical recess, a clamping device for engaging opposite sides of the tool comprising two substantially truncated conical members fitting in said recess and positioned on opposite sides of the tool when inserted and means for forcing said members inwardly in said recess.

5. A chuck comprising a tool consisting of a shank and tool holder proper, the latter having a longitudinal slot extending substantially from end to end of such tool holder proper to receive a flat tool or drill and designed to coöperate with the same along its length and thereby hold the tool against rotation, said slot terminating at its outer end in a conical recess, a clamping device for engaging opposite sides of the tool comprising two substantially truncated conical members fitting in said recess and positioned on opposite sides of the tool when inserted, means for forcing said members inwardly to clamp the tool, and an adjustable block movable longitudinally in said slot and adapted to coöperate with the inner end of the tool when inserted.

6. A chuck comprising a tool holder having a longitudinal slot with two substantially parallel sides to receive a flat tool or drill and adapted to prevent rotation thereof, an adjustable abutment movable in said slot and arranged to coöperate with the inner end of the tool, a sleeve mounted to rotate on said tool holder but longitudinally immovable thereon, said sleeve being operatively connected with said abutment to adjust the latter longitudinally in the slot, and means for so holding such sleeve longitudinally immovable.

7. A chuck comprising a tool holder having a longitudinal slot to receive a flat tool or drill, an adjustable block extending transversely of the tool holder and movable longitudinally in the slot thereof, said block being arranged to coöperate with the inner end of an inserted tool or drill, and a sleeve mounted to rotate on said tool holder and arranged to coöperate with said block to adjust its position longitudinally, said tool holder having a flange against which the sleeve bears to prevent longitudinal movement with respect to the tool holder.

8. A chuck comprising a tool holder having a longitudinal slot to receive a flat tool or drill, an adjustable block movable longitudinally in the slot of the tool holder and screw-threaded at its ends, and an interiorly screw-threaded sleeve engaging said block and by its rotation arranged to move and adjust the latter in one direction or the other, and means adapted to restrain the sleeve from longitudinal movement.

9. A chuck comprising a tool holder having a longitudinal slot to receive a flat tool or drill, said tool holder having flanges 10 and 11, an adjustable block screw-threaded at its ends and movable longitudinally in the slot of the tool holder, and an interiorly screw-threaded sleeve surrounding the tool holder between said flanges and interiorly screw-threaded to engage the ends of the block to move and adjust the latter longitudinally of the tool holder.

10. A chuck comprising a tool holder having a central longitudinal transverse slot of oblong cross-section adapted to receive and prevent rotation of a flat tool or drill and having its outer end conically recessed or bored, clamping members fitting into such recess and arranged to clamp the tool between them, means for actuating the clamping members, a block slidable in said slot and against which the inner end of the tool abuts, a sleeve mounted to rotate on the tool holder and operatively connected with the block for adjusting the latter longitudinally of the slot, and means for preventing longitudinal movement of the sleeve with respect to the tool holder when the former is rotated.

HENRY J. KIMMAN.

Witnesses:
C. J. CAREW,
S. W. PRINCE.